United States Patent [19]
Hall et al.

[11] Patent Number: 5,236,340
[45] Date of Patent: Aug. 17, 1993

[54] CONTAINERS

[76] Inventors: David J. Hall, 33 King Alfred Drive, Didcot, Oxon, United Kingdom, OX11 7MT; Dennis Schofield, 12 Fleetway, Didcot, Oxon, United Kingdom, OX11 8DA

[21] Appl. No.: 855,540
[22] Filed: Mar. 20, 1992

[30] Foreign Application Priority Data

Mar. 22, 1991 [GB] United Kingdom ............... 9106157

[51] Int. Cl.⁵ .............................................. B65D 25/20
[52] U.S. Cl. .................................... 220/606; 220/608; 220/482
[58] Field of Search ............... 220/606, 605, 608, 555, 220/553, 482, 23.83, 23.86, 23.8, 631, 636, 735; 206/519, 503

[56] References Cited

U.S. PATENT DOCUMENTS

| | | | |
|---|---|---|---|
| 2,706,574 | 4/1955 | Clement | 220/23.8 |
| 2,896,809 | 7/1959 | Metzger et al. | 220/23.8 |
| 3,325,038 | 6/1967 | Ferney | 220/482 |
| 3,341,876 | 9/1967 | Campbell | 220/555 |
| 3,993,192 | 11/1976 | Bunn | 220/23.8 |
| 4,279,354 | 7/1981 | Conti | 220/23.83 |
| 4,428,493 | 1/1984 | McDonough | 220/555 |
| 4,429,789 | 2/1984 | Puckett, Jr. | 220/555 |
| 4,729,489 | 3/1988 | Papaianni | 220/555 |
| 5,064,090 | 11/1991 | Farrier | 220/482 |
| 5,086,917 | 2/1992 | Dziersk et al. | 220/555 |

FOREIGN PATENT DOCUMENTS

| | | | |
|---|---|---|---|
| 1351512 | 12/1963 | France | 220/606 |
| 353143 | 5/1961 | Switzerland | 206/515 |

Primary Examiner—Allan N. Shoap
Assistant Examiner—S. Castellano
Attorney, Agent, or Firm—Spencer, Frank & Schneider

[57] ABSTRACT

A container, such as a bucket, for containing tools of particulate material, such as mixed sand and cement, which has two leg members extending from its underside, the leg members being arranged to sit astride the apex of a pitched roof so that the container can sit stably on the roof apex. The container is useful for working on a roof, particularly when fitting the ridge tiles.

7 Claims, 7 Drawing Sheets

CONTAINERS

BACKGROUND OF THE INVENTION

This invention relates to containers, particularly containers which are capable of being used to hold material and tools when workmen are carrying out roofing work. When the pitched roof of a house is being built or repaired, it is very difficult to position building material and tools, which are to be used in the work, on the sloping parts of the roof. Slates and tiles can often be stacked by lodging them in an unfinished part of the roof against the battens which are nailed to the roof rafters as part of the construction, but they can be dislodged if kicked by a workman. Tools and other material are even more difficult to retain on a partly-constructed roof. At the final stage of the construction, when the ridge tiles are being put in place, mixed sand and cement needed for fixing the ridge tiles in place, has to be carried up onto the roof in a bucket and this is very difficult to position securely, particularly as it has to be moved frequently as work proceeds.

SUMMARY OF THE INVENTION

The present invention provides a container which is capable of solving this problem and can be used to provide safe storage for a range of materials and tools. According to the invention there is provided a container which is capable of holding objects, such as hand tools, or particulate material, such as mixed sand and cement, the container comprising leg members capable of being positioned so as to sit securely astride the apex of a pitched roof. Preferably, the leg members are formed as an integral part of the container.

BRIEF DESCRIPTION OF THE DRAWINGS

An embodiment of the invention will now be described, with reference to the accompanying drawings, in which.

DESCRIPTION OF THE PREFERRED EMBODIMENTS

Figure 1:
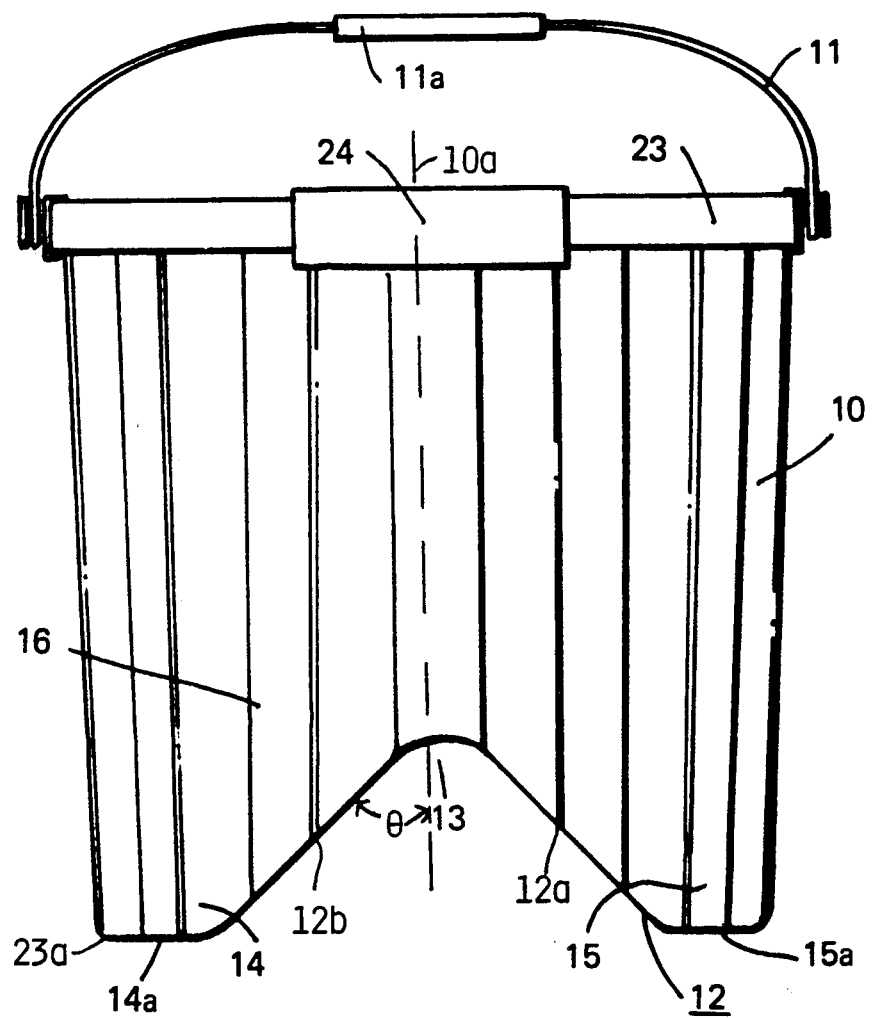
FIG. 1 is a side view of a bucket constructed in accordance with the invention.
Figure 2:
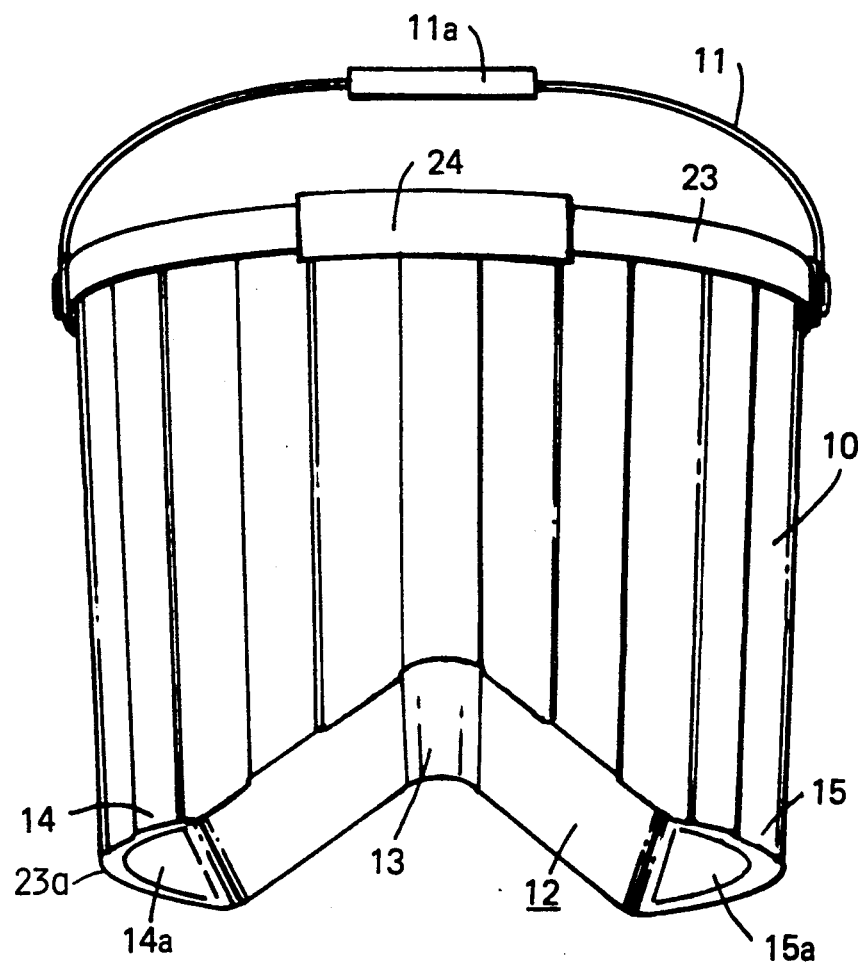
FIG. 2 is a perspective view from below of the bucket of FIG. 1.
Figure 3:
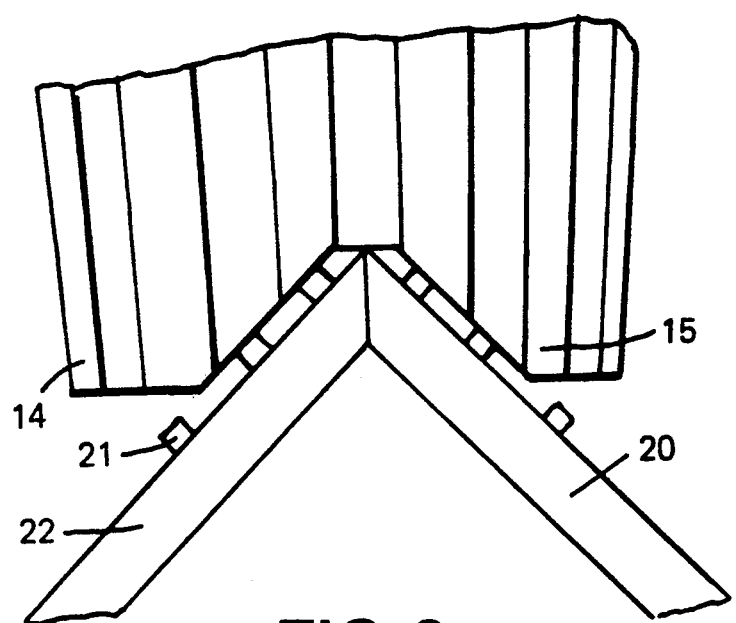
FIG. 3 shows the lower part of a bucket, constructed in accordance with the invention, positioned straddling the apex of a roof which is under construction or repair, the roof being shown in vertical cross-section.

In FIGS. 1 and 2, a bucket 10, having a longitudinal axis 10a is provided with the usual semi-circular metal handle 11, which has a wooden grip 11a positioned in its center. The bucket has a circular horizontal cross-section for most of its height, an upper rim 23 and a lower edge 23a. The base 12 has two intersecting base member portions 12a and 12b which form an angle Θ with the longitudinal axis, and a central reentrant portion 13 which thus forms two downwardly extending protrusions or leg members 14, 15. Each leg member 14, 15 has a respective flat base area 14a, 15a and these areas together enable the bucket to stand stably when placed on an ordinary flat floor. However, when the bucket is placed astride the apex of a pitched roof, the sloping base member portions 12b, 12a of leg members 14, 15 will contact the side flanks of the roof and the bucket will again sit stably. As shown in FIG. 3, the bucket can be positioned astride a roof 20 under construction, with leg members 14, 15 lying against the strips of batten 21 which extend along the roof rafters 22.

In an alternative arrangement, not shown in the drawings, the central reentrant 13 of the bucket can be of sufficient width that, if the bucket is placed on a finished roof, the leg members can straddle the ridge tiles and contact the sloping surfaces of the roof tiles below the ridge tiles. Thus, the bucket will sit stably even on the completed part of a roof.

Figure 4:
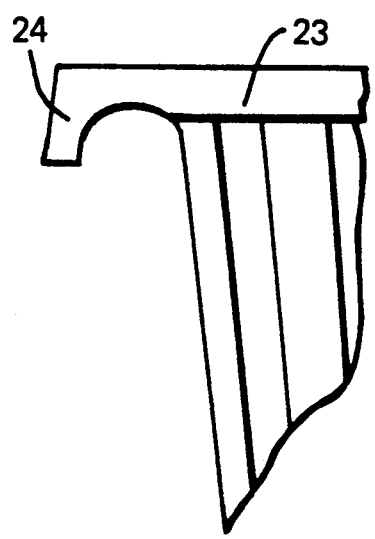
FIG. 4 shows a scrap view of part of the rim of a bucket.

The bucket is shown with external ribs 16 which provide strength and ornamentation to its sides. As shown more particularly in FIG. 4 (but also shown in FIGS. 1 and 2), the bucket has an upper rim 23, which is formed folded over all around its circumference to give strength to the bucket and which has a hook 24 formed as an extension of it. The hook 24 is arranged conveniently for hooking over an external member such as a batten so as to give the user an alternative way of positioning the bucket during roofing operations, particularly when moving operations from one part of a roof to another. The hook 24 can also be used to hook over the rung of a ladder.

Figure 5:
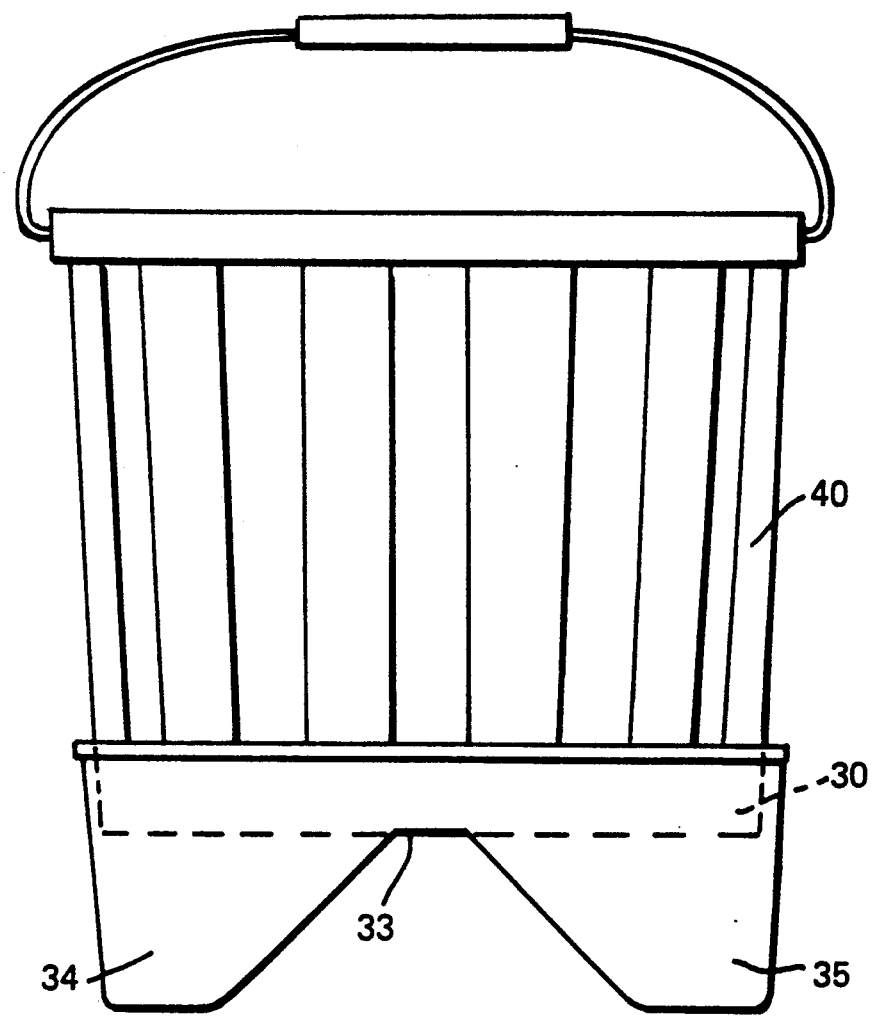
FIG. 5 is an alternative embodiment of the invention, and, FIGS. 6 and 7 are perspective views of two alternative forms of bucket.

FIG. 5 shows an alternative form of the invention in which the leg members are formed as a separate unit or base into which a bucket can fit. Unit 30 comprises leg members 34, 35 and the unit has a central reentrant 33. In this case an ordinary flat-bottomed bucket 40 is fitted into unit 30, being either a tight fit therein or being provided with a quick-action set of catches (not shown) which can secure the bucket to the unit when it is needed for roofing work.

Figure 6:
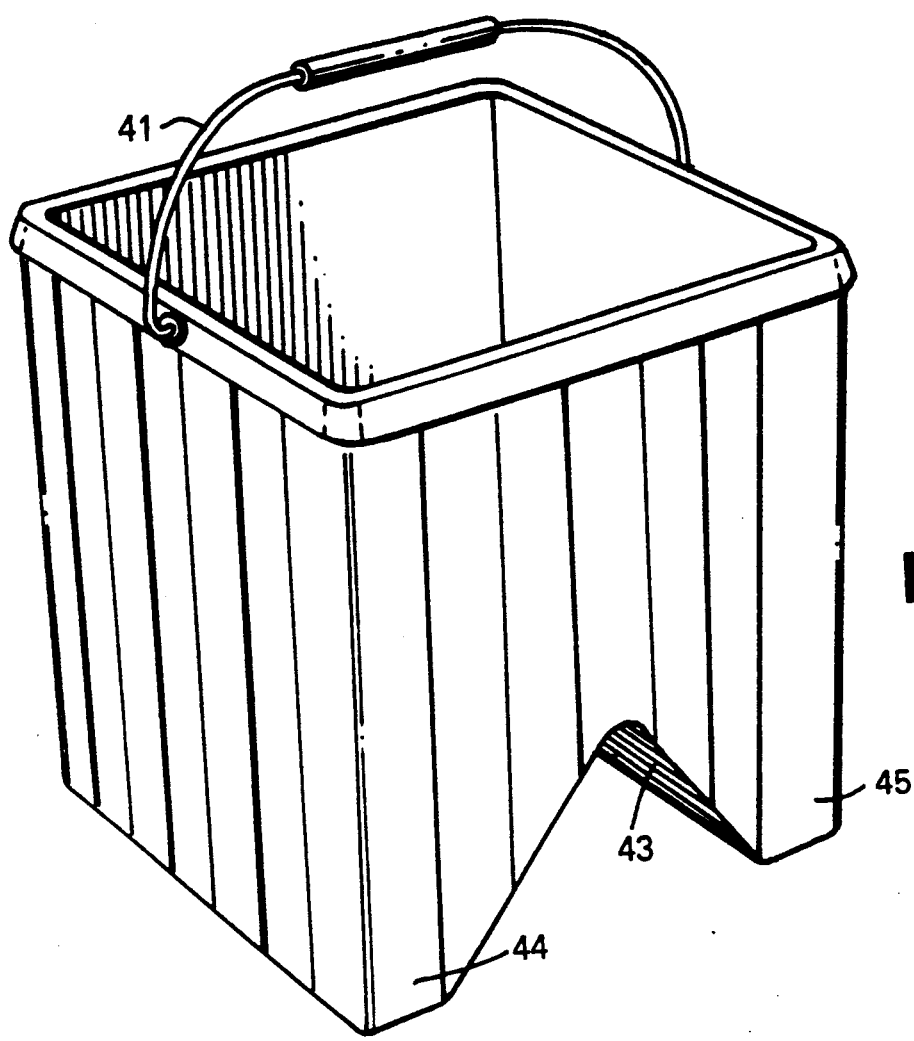
Figure 7:
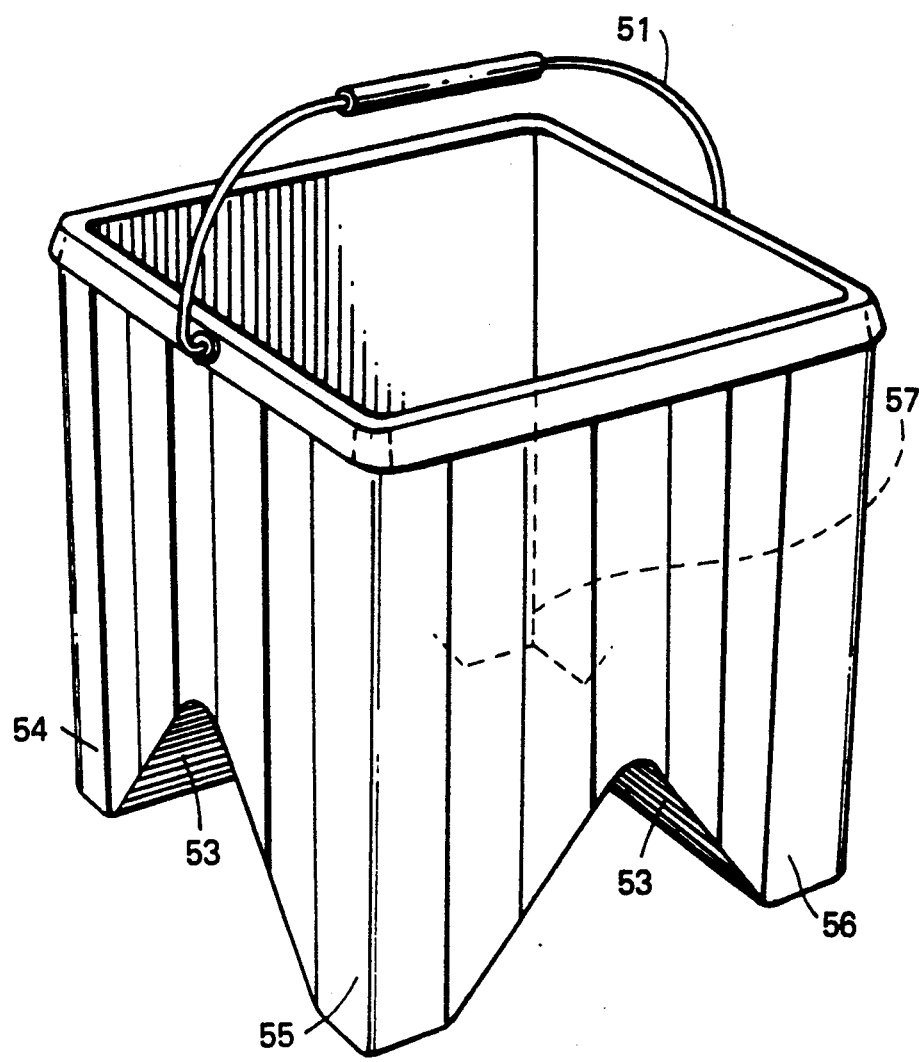

FIG. 6 shows a bucket which has a square cross-section, having the usual handle 41, with a reentrant 43 forming leg members 44, 45. FIG. 7 shows a bucket which has a square cross-section, having the usual handle 51, with a cross-shaped reentrant 53 which thus forms four leg members 54, 55, 56 and 57, one at each corner, so that there are two alternative ways of placing the bucket to straddle the apex of a pitched roof.

We claim:

1. A container capable of being positioned so as to sit (1) securely astride the apex of a roof and (2) on a horizontal surface, said container having a longitudinal axis, comprising an upper rim surrounding said longitudinal axis;

a lower edge spaced from said upper rim;

first and second planar leg members extending from said lower edge in a direction substantially perpendicular to said longitudinal axis; and a base member having first and second base member portions, each of said base member portions extending from said leg members at an acute angle to said longitudinal axis to form sloping surfaces, said base member portions intersecting at said longitudinal axis to form a central reentrant portion projecting along said axis toward said upper rim, whereby said container rests on said leg members when mounted on said horizontal surface and on said first and second base member portion when seated astride the apex of said roof, the angle between each of said base member portions and said longitudinal axis being substantially similar to the pitch of the roof such that said base member portions are in substantial contact with roof surfaces adjacent the apex of the roof.

2. A container as claimed in claim 1, wherein the leg members are an integral part of the container.

3. A container as claimed in claim 2, wherein said base member is an integral part of the container.

4. A container as claimed in claim 1, in which the container has an opening surrounded by said upper rim, and wherein said upper rim includes a hook adapted to hook over an external member.

5. A container as claimed in claim 4, in which the hook is formed integrally with the rim.

6. A container as claimed in claim 1 which further comprises a handle secured to said upper rim.

7. A container as claimed in claim 1 wherein said upper rim and said lower edge are circular.

* * * * *